United States Patent [19]

Eagleton

[11] Patent Number: 5,094,273
[45] Date of Patent: Mar. 10, 1992

[54] VENTILATION DUCTING

[75] Inventor: Anthony C. Eagleton, Lesmurdie, Australia

[73] Assignee: Acme Group Pty Ltd., Australia

[21] Appl. No.: 557,392

[22] Filed: Jul. 23, 1990

[30] Foreign Application Priority Data

Jul. 24, 1989 [AU] Australia ............................ PJ5408
Jun. 14, 1990 [AU] Australia ............................ PK0630

[51] Int. Cl.⁵ .............................................. F16L 3/18
[52] U.S. Cl. ............................. 138/107; 138/103; 138/128; 138/155; 138/DIG. 4; 98/903; 285/137.2; 454/903
[58] Field of Search ............... 138/106, 107, 118, 128, 138/103, 120, 155, 177, 178, DIG. 4, DIG. 7; 98/40.19, DIG. 7; 405/52, 195; 285/114, 136, 137.1, 137.2

[56] References Cited

U.S. PATENT DOCUMENTS

| | | | |
|---|---|---|---|
| 1,211,067 | 1/1917 | Braly | 138/107 |
| 2,091,265 | 8/1937 | Brown | 138/107 |
| 2,222,497 | 11/1940 | Bins | 138/107 |
| 3,095,908 | 7/1963 | Plummer | 138/107 |
| 3,520,244 | 7/1970 | Gaines | 138/107 |
| 4,298,295 | 11/1981 | Bozzo et al. | 138/118 |

FOREIGN PATENT DOCUMENTS

| | | |
|---|---|---|
| 8283875 | 8/1975 | Australia . |
| 1635283 | 1/1984 | Australia . |
| 3461684 | 5/1985 | Australia . |
| 1645188 | 11/1988 | Australia . |
| 849540 | 9/1952 | Fed. Rep. of Germany . |
| 1026261 | 3/1958 | Fed. Rep. of Germany ...... 138/107 |
| 1200775 | 9/1965 | Fed. Rep. of Germany . |
| 3502445 | 7/1986 | Fed. Rep. of Germany . |
| 984183 | 2/1965 | United Kingdom . |
| 1084299 | 9/1967 | United Kingdom ............... 138/107 |
| 1317358 | 5/1973 | United Kingdom . |
| 2012901 | 8/1979 | United Kingdom . |
| 2032044 | 4/1980 | United Kingdom ............... 138/107 |
| 2047379 | 11/1980 | United Kingdom . |
| 2172385 | 9/1986 | United Kingdom . |
| 2207729 | 2/1989 | United Kingdom . |

*Primary Examiner*—James E. Bryant, III
*Attorney, Agent, or Firm*—Eckert Seamans Cherin & Mellott

[57] ABSTRACT

Ventilation ducting having a substantially oval and/or elliptical cross-section includes an intermediate section, and an end section at opposite ends of the intermediate section. Both the intermediate and the end sections include a pair of adjacent ducts. The ducts in the intermediate section are separated along their length by a common wall. The common wall may be perforated sheet, mesh or net material. The ducts at each end section are separate tubular members. An engaging device is provided at the intermediate section for suspending the ducting above the ground. A coupling device is provided at each end of the intermediate section for joining together adjacent lengths of the ventilation ducting.

11 Claims, 6 Drawing Sheets

VENTILATION DUCTING

BACKGROUND OF THE INVENTION

1. Field of the Invention

This invention relates to a flexible ducting which can be used in closed situations such as underground mines.

2. Prior Art

When in use ventilation ducting is suspended from an overhead cable or other suspension means.

A disadvantage with ventilation ducting currently in use relates to the fact that most tubing is of a substantially circular configuration and in order to provide the desired air flow through the tubing, it is necessary for such tubing to be of a large diameter. Where such tubing is used in a confined situation, such as a mine or tunnel, the amount of head room available is reduced considerably.

SUMMARY OF THE INVENTION

It is an object of this invention to provide a ventilating ducting which can provide the desired air flow with a reduced profile or width compared to comparable circular or part circular ventilating tubes currently in use.

In one form the invention resides in flexible ducting comprising an intermediate section having a substantially oval and/or elliptical cross-section and an end section to oval and/or elliptical cross-section and an end section to each end of the intermediate section, said intermediate and end sections defining two ducts where the ducts in the intermediate section are separated along their length by a web extending between opposed sides of the intermediate section, the ducts at each end section being formed as separate tubular members, an engaging means provided along the intermediate section for engagement with a suspension means, a coupling means provided around the ducting at the ends of the intermediate section said tubular members being capable of being retracted into the intermediate section to form a female end or extending beyond the end of the intermediate section to form a male end.

BRIEF DESCRIPTION OF THE DRAWINGS

The invention will be more fully understood in the light of the following description of one specific embodiment. The description is made with reference to the accompanying drawings of which.

DETAILED DESCRIPTION OF THE PREFERRED EMBODIMENTS

Figure 1:
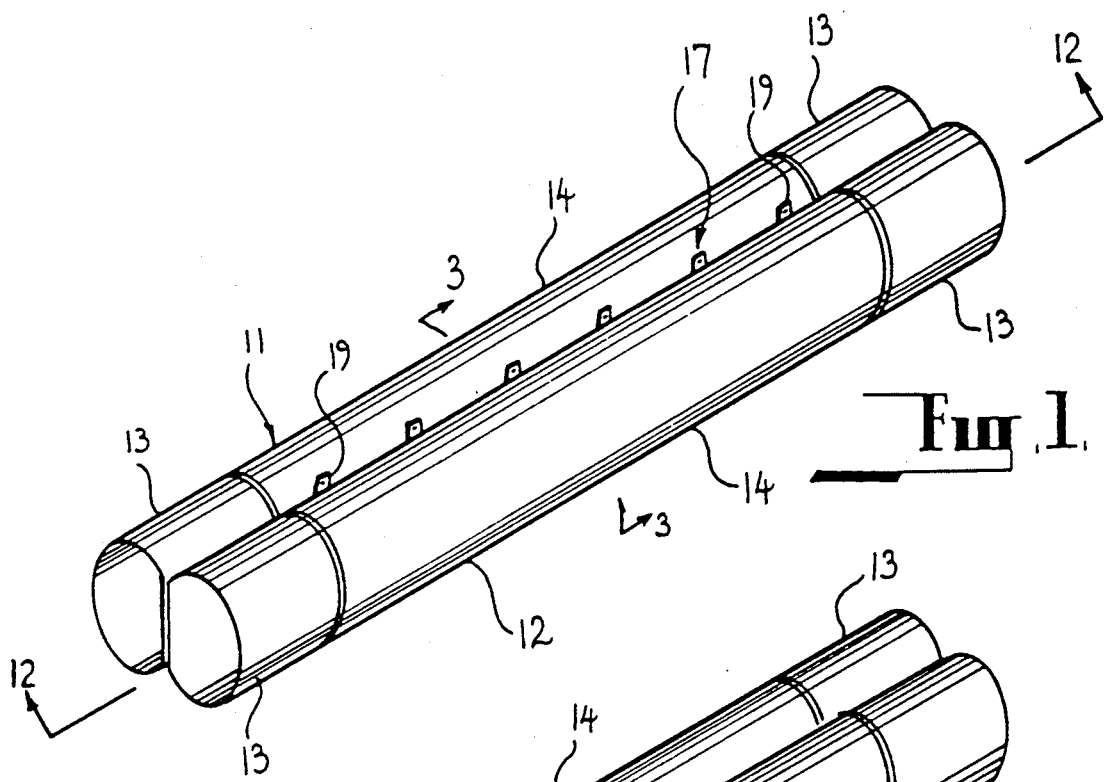
FIG. 1 is a perspective view from above of a ventilating tubing according to the embodiment.
Figure 2:
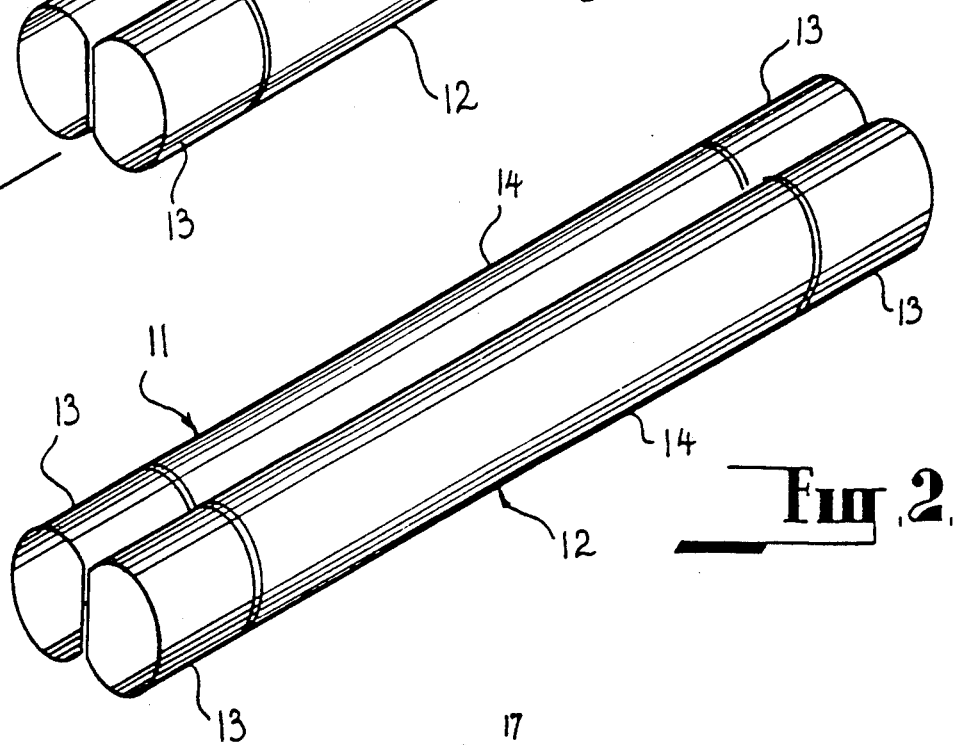
FIG. 2 is a perspective view from below of the ventilating tubing.
Figure 3:
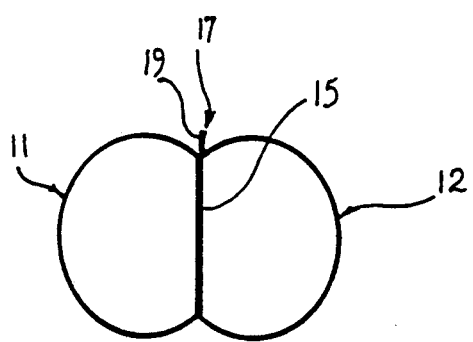
FIG. 3 is a cross-section on line 3—3 of FIG. 1.

The embodiment is directed towards ventilating ducting which is a variation of that disclosed in Australian Patent No. 471,926 wherein each end of the tubular member of the tubing is formed with an extension of the hem defining the end of the tubing which can be withdrawn from the end of the tubing or retracted into the tubing to define a male or female end respectively and allow for mating interengagement of the ends of corresponding lengths of tubing.

The embodiment is directed towards ventilation ducting which can be used in restricted environments such as mine shafts and tunnels whereby the depth of the space occupied by the ventilating ducting is reduced from that of conventional circular cross-sectioned tubing. The embodiment comprises ducting having two ducts, 11 and 12 each being of tubular configuration and comprising an end section 13 at each end of an intermediate section 14 which extends for a major part of the overall length of the tubing 14. The end sections 13 of each portion are formed as tubular elements. The intermediate sections 14 of each portion of the tubing share a common wall 15 throughout their length. The common wall 15 is defined by a web of material which extends between the upper and lower surfaces of the tubing. If desired the common wall 15 may be perforated to allow for a transfer of air between each of the portions 11 and 12.

An engaging means 17 is provided along the ducting at the upper longitudinal edge of the common wall 15 to facilitate engaging the ventilation ducting with an overhead suspension means such as a cable fixed to the roof of the mine or tunnel. The engaging means 17 comprises a plurality of longitudinally spaced tabs 19 each supporting an eyelet 21. Alternatively the engaging means may comprise a continuous strip fixed to or adjacent the upper edge of the common wall 15 or a hem provided in the upper edge of the common wall, having eyelets mounted thereto at spaced intervals.

Figure 4:
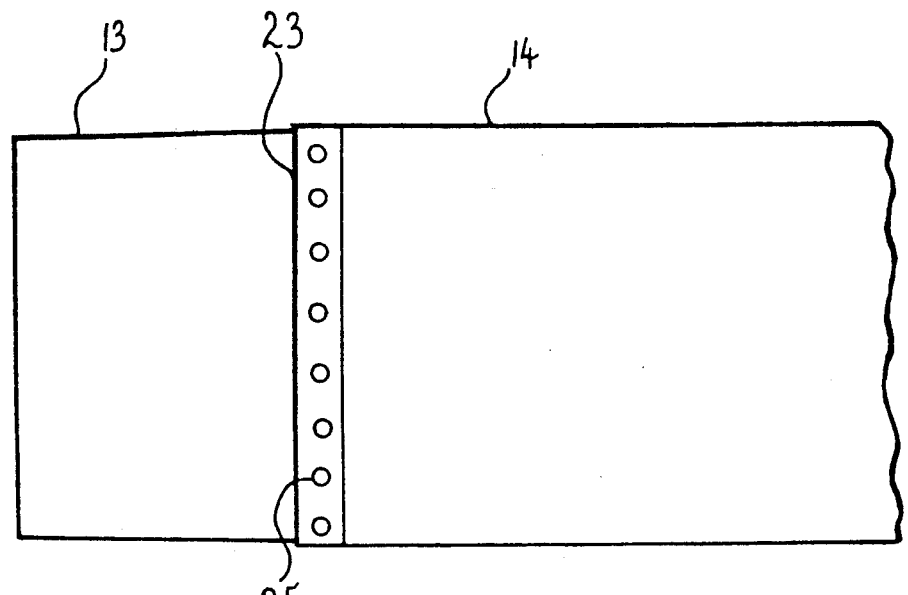
FIG. 4 is a fragmentary view showing an end of the ventilating tubing arranged as a male fitting.
Figure 5:
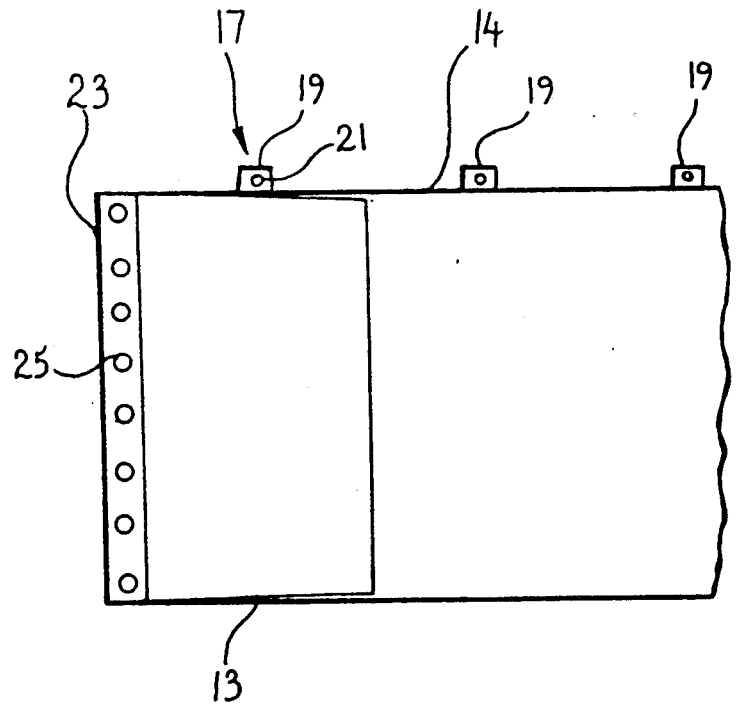
FIG. 5 is a fragmentary view showing an end of the ventilating tubing arranged as a female fitting.
Figure 6:
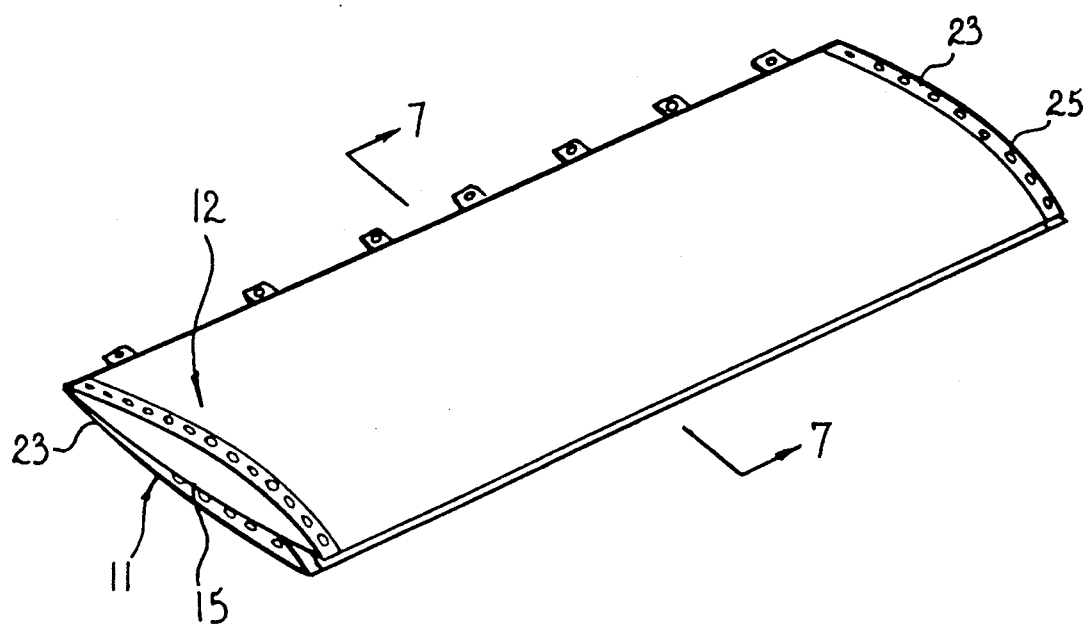
FIG. 6 is a perspective view of the ventilating ducting in a collapsed condition.
Figure 7:
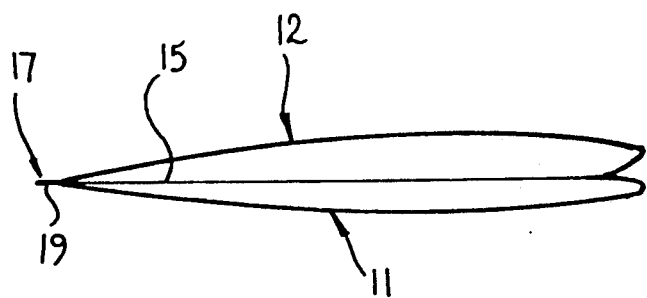
FIG. 7 is a schematic cross-sectional view on line 7—7 of FIG. 6.

A coupling means 23 is provided at each end of the intermediate section 14. The coupling means 23 can comprise a hem formed from the material of the tubing having a series of eyelets therein, a continuous strip having a series of eyelets therein and fixed around the circumference of each end of the intermediate section or a series of tabs each having an eyelet therein and fixed at spaced intervals around the circumference of each end of the intermediate section. To facilitate interengagement of lengths of ducting, each tubular element extending beyond each end of the intermediate section can be tucked within the intermediate section of the tube as shown at FIG. 5 to define a female fitting; or the two tubular elements 13 at one end of a length of tubing may be withdrawn from within the tube to extend outwardly therefrom as shown in FIG. 4 to define a male fitting for receipt within the female fitting of another length of tubing to bring the coupling means 23 at the ends of the intermediate sections of both lengths of ducting into abutting relationship end of the eyelets 25 mounted in the coupling means 23 at each abutting end of the intermediate sections are then laced or otherwise connected together to hold the abutting lengths of ducting in close engagement.

As a result of the embodiment, ventilating ducting is produced which has the advantage of being flexible but which also has the advantage of minimising the depth of the space occupied by the ducting to increase the head room available within the space having the ventilating tubing in position. The ducting can be adequately supported by the engaging means 17 disposed above the common wall 15. Furthermore the ducting is of a unitary configuration throughout its length since the coupling between adjacent lengths of tubing is effected at the abutting ends of the intermediate sections.

Figure 8:
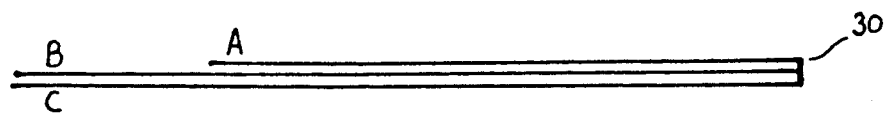
FIG. 8 is a cross-sectional view of three lengths of flexible sheet material laid out according to one method of forming the intermediate section.
Figure 9:
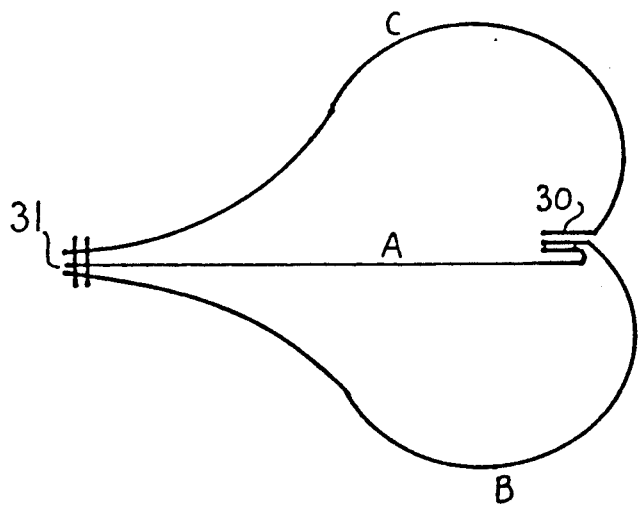
FIG. 9 is a schematic cross-sectional view of the sheets of FIG. 8 joined according to one method of forming the intermediate section.

According to one method of forming the intermediate section of the embodiment as shown at FIG. 8, three lengths of flexible sheet material are laid out where one length A is to ultimately form the central wall 15 and has a smaller width than the other common two lengths B and C which are to define the two tubular portions 11 and 12. The sheets are laid over each other such that one lateral edge 30 of each sheet are aligned, and the one length A overlies the other two lengths B and C. The lengths are then joined together along their aligned one lateral edges 30 as shown at FIG. 8. The third length C is then relocated such that it lies to the opposite side of the one length A from the second length B and the other lateral edge 31 of each of the sheets are aligned and joined to define a lip seam as shown at FIG. 9 to which the tabs 19 of the engaging means 17 are attached.

Figure 10:
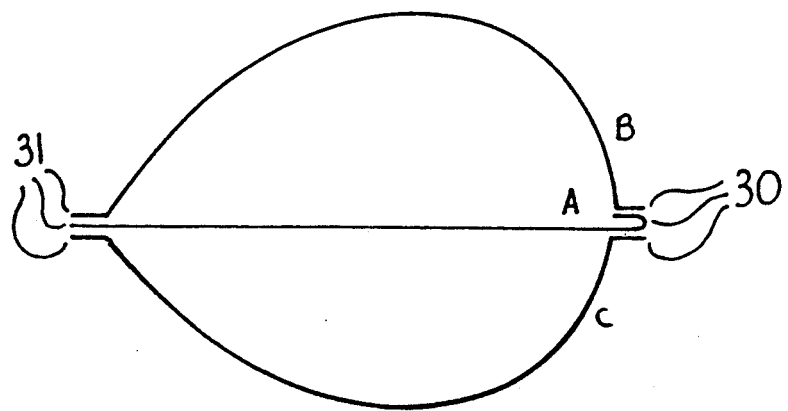
FIG. 10 is a schematic cross-sectional view of three sheets joined according to a second method of forming the intermediate section.
Figure 11:
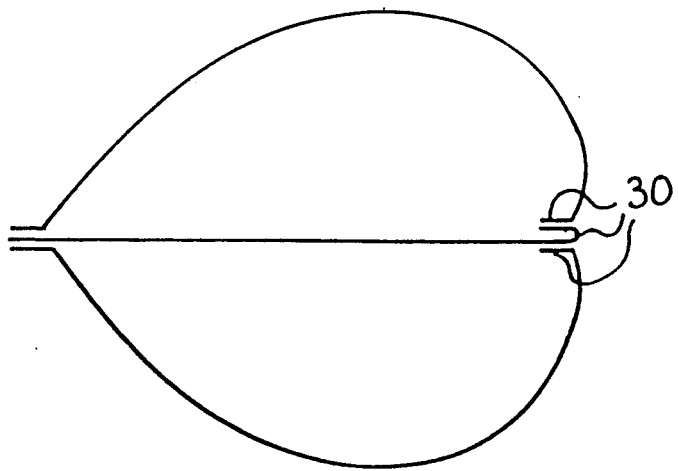
FIG. 11 is a schematic cross-sectional view of three sheets joined according to a third method of forming the intermediate section.
Figure 12:
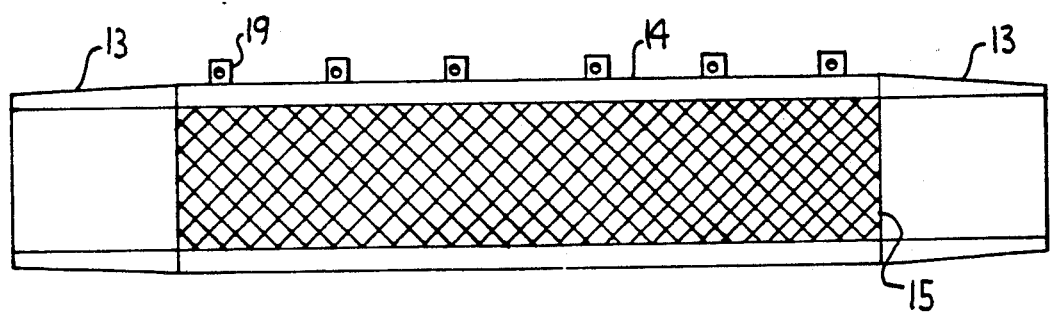
FIG. 12 is a cross-sectional view along line 12—12 of FIG. 1.

If desired any other method of assembly may be used and in this regard FIGS. 10 and 11 illustrate two alternative methods. According to the method of FIG. 10 the sheets are laid one on the other with the one length A which is to define the central wall located between the other two sheets and the one lateral edge 30 of each are joined. The other lateral edges 31 are then aligned and joined. In the case of method of FIG. 11 the one sheet A and the other two sheets B and C are laid side by side with their lateral edges overlapping. The overlapped edges of the other two sheets B and C are to each side of the one sheet A. The edges 30 are then joined and then the other lateral edges 31 are brought into alignment and joined.

On completion of the intermediate section by any of the methods designated above the tubular end section 13 are then located inside each duct 11 and 12 at each end thereof such that the tubular end section are each fully received in the ducts. The coupling means 23 in the form of a continuous strip having eyelets therein is then applied to each end to extend around the circumference and the coupling means 23 and end portion are then fixed to the respective ends of the intermediate sections. To form a male end fitting the tubular end sections 13 are extracted from within the intermediate section at one end thereof.

If desired the common wall 15 may be formed of any sheet and/or web material capable of supporting the opposed sides of the ducting to maintain the substantially overall cross-sectional configuration. Such web material may comprise perforate or imperforate sheeting and mesh or net material. Alternatively the common wall may comprise longitudinally spaced elements extending between the opposed sides. Such elements may comprise strips of any suitable sheet and/or web material.

It should be appreciated that the scope of the present invention need not be limited to the particular scope of the embodiment described above.

I claim:

1. Ventilation ducting having a substantially oval and/or elliptical cross-section, said ducting comprising an intermediate section and an end section at each end of the intermediate section, said intermediate and end sections defining two ducts wherein the ducts in the intermediate section are separated along their length by a web extending between opposed sides of the intermediate section, the ducts at each end section being formed as separate tubular members, said ducting also having an engaging means provided along the intermediate section for engagement with a means for suspending and ducting above aground surface, and a coupling means provided around the ducting at the ends of the intermediate section, wherein said tubular members are capable of being retracted into the intermediate section to form a female end or extending beyond the end of the intermediate section to form a male end of the ducting.

2. Ventilation ducting as claimed in claim 1, wherein the coupling means comprising a strip fixed to the ends of the intermediate section, said strip having a set of spaced eyelets.

3. Ventilation ducting as claimed in claim 1, wherein the coupling means comprises a set of spaced webs having eyelets therein fixed to the end of the intermediate section.

4. Ventilation ducting as claimed in claim 1, wherein said web comprises a wall separating the two ducts.

5. Ventilation ducting as claimed in claim 4, wherein the wall permits air flow between said ducts.

6. Ventilation ducting as claimed in claim 1, wherein said web is formed of a mesh or a net like material.

7. Ventilation ducting as claimed in claim 1, wherein said web comprises a set of elements extending between said opposed sides of said ducting.

8. Ventilation ducting as claimed in claim 1, wherein the engaging means is located at the junction of one edge of the web with one side of the ducting.

9. Ventilation ducting as claimed in claim 8, wherein said engaging means comprises a set of longitudinally spaced tabs each having an eyelet therein.

10. Ventilation ducting as claimed in claim 8, wherein the engaging means comprises a strip having a set of spaced eyelets therein.

11. Ventilation ducting as claimed in claim 8, wherein the engaging means comprises a hem formed at the junction of the web and the side of the ducting.

* * * * *

UNITED STATES PATENT AND TRADEMARK OFFICE
CERTIFICATE OF CORRECTION

PATENT NO. : 5,094,273
DATED : March 10, 1992
INVENTOR(S) : Anthony C. Eagleton

It is certified that error appears in the above-identified patent and that said Letters Patent is hereby corrected as shown below:

<u>IN THE CLAIMS</u>

Column 4, line 28, "and ducting" should read --said ducting--.

Column 4, line 28, "aground" should read --a ground--.

Column 4, line 35, "comprising" should read --comprises--.

Signed and Sealed this

Twenty-second Day of June, 1993

Attest:

MICHAEL K. KIRK

*Attesting Officer*   *Acting Commissioner of Patents and Trademarks*